(12) United States Patent
Goeppner et al.

(10) Patent No.: US 7,630,157 B1
(45) Date of Patent: Dec. 8, 2009

(54) METHOD OF SELECTING AN AUDIO SOURCE

(75) Inventors: Andrew T. Goeppner, Plain City, OH (US); Aaron Ambrose, Dublin, OH (US); John Vilkinofsky, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 598 days.

(21) Appl. No.: 11/279,731

(22) Filed: Apr. 13, 2006

(51) Int. Cl.
*G11B 15/04* (2006.01)
(52) U.S. Cl. .................................. 360/60; 360/75; 369/2
(58) Field of Classification Search ........................ None
See application file for complete search history.

(56) References Cited

U.S. PATENT DOCUMENTS

| | | | |
|---|---|---|---|
| 4,642,715 A * | 2/1987 | Ende | 360/97.02 |
| 5,825,581 A | 10/1998 | Morita et al. | |
| 6,151,183 A * | 11/2000 | Ogasawara et al. | 360/75 |
| 6,390,055 B1 * | 5/2002 | Sivashankar et al. | 123/295 |
| 6,603,628 B1 | 8/2003 | Gillis et al. | |
| 6,646,821 B2 | 11/2003 | Bernett et al. | |
| 6,683,747 B2 | 1/2004 | Bernett et al. | |
| 6,785,089 B2 | 8/2004 | Bernett et al. | |
| 6,798,605 B2 | 9/2004 | Kurita et al. | |
| 6,804,987 B2 | 10/2004 | Kloeppel et al. | |
| 6,819,517 B2 | 11/2004 | Fioravanti et al. | |
| 2004/0264028 A1 | 12/2004 | Ishii et al. | |
| 2005/0013057 A1 | 1/2005 | Kurita et al. | |

* cited by examiner

*Primary Examiner*—Jason C Olson
(74) *Attorney, Agent, or Firm*—Plumsea Law Group, LLC; Mark E. Duell

(57) ABSTRACT

A system and method for selecting an audio source is disclosed. The system and method can be used to prevent the selection of a hard disk drive as an audio source if the local ambient pressure in which the motor vehicle is operating is less than a predetermined pressure. The system may obtain ambient pressure data from various different types of sensors including a barometric pressure sensor or an engine combustion sensor. In some cases, the system and method can compute the ambient pressure using global positioning system (GPS) information.

20 Claims, 3 Drawing Sheets

METHOD OF SELECTING AN AUDIO SOURCE

BACKGROUND OF THE INVENTION

1. Field of the Invention

The present invention relates generally to motor vehicles, and in particular to audio systems for motor vehicles.

2. Description of Related Art

Most commercial motor vehicles include some form of audio system. The type and capabilities of the audio system vary widely. A basic audio system may as simple as an AM/FM radio and a loudspeaker. More sophisticated systems may include a cassette deck or compact disk (CD) player, and some also have the capability to play digital versatile disks (DVDs) and other video formats as well as audio.

As digital audio has become more popular, more motor vehicle audio systems have begun to include hard disk drives as audio sources. Alternatively, some motor vehicle audio systems provide a hard disk drive docking device with which the user can connect his or her own hard disk drive. The hard disk drives typically store digital audio files of the user's choice.

Physically, a hard disk drive comprises a stack of magnetic platters with a read head positioned over each platter. The distance between the read head and the platter may be only a few micrometers. For the sake of comparison, the diameter of a human hair is generally in the range of 80-100 micrometers.

All hard disk drives have environmental operating limits, extremes of pressure, temperature, humidity, and G-force beyond which the hard disk drive is not designed to operate. Operation beyond a hard disk drive's environmental operating limits may cause damage to the hard disk drive. As one example, increased or decreased atmospheric pressure may stress the read head mechanism, causing the heads to move downward and contact the platters, potentially damaging the platters and erasing the data stored on them. Alternatively, if the heads are moved too far away from the platters, they may no longer be within operating distance of the platters.

In their operation, motor vehicles are subject to a wide range of operating conditions. Although hard disk drives have become more common in motor vehicle audio systems, relatively little has been done to see that hard drives which operate in motor vehicles do not exceed their environmental operating limits.

SUMMARY OF THE INVENTION

A system and method for selecting an audio source is disclosed. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

In one aspect, the invention provides a motor vehicle that comprises a peripheral device capable of providing information related to an ambient pressure and an audio system. The audio system includes a hard disk drive containing digital audio information and a central unit in communication with the hard disk drive and the peripheral device. The central unit receives the information related to the ambient pressure from the peripheral device. If the ambient pressure is less than a predetermined pressure, the central unit prevents the selection of the hard disk drive as an available digital audio source.

In another aspect, the peripheral device comprises a barometric pressure sensor.

In another aspect, the peripheral device comprises a sensor used to control an engine installed in the motor vehicle.

In another aspect, the peripheral device comprises a global positioning system receiver associated with the motor vehicle.

In another aspect, the predetermined pressure is substantially the same as an environmental operating limit of the hard disk drive.

In another aspect, the audio system further comprises an additional audio source.

In another aspect, the additional audio source is selected from the group consisting of CD players, DVD players, AM/FM radio receivers, and satellite radio receivers.

In another aspect, the invention provides a method of selecting an audio source in a motor vehicle audio system including a hard disk drive as an audio source. The method comprises determining an ambient pressure using information received from a peripheral device, comparing the ambient pressure to a predetermined threshold, allowing the selection of the hard disk drive as the audio source if the ambient pressure is greater than or equal to the predetermined threshold, and preventing the selection of the hard disk drive as a digital audio source if the ambient pressure is less than the predetermined threshold.

In another aspect, the peripheral device comprises a global positioning system receiver. In those embodiments, the determining step comprises obtaining altitude data based on a location of the motor vehicle established by the global positioning system receiver and calculating a corresponding ambient pressure using a relationship between altitude and pressure.

In another aspect, the peripheral device comprises a barometric pressure sensor.

In another aspect, the peripheral device comprises an engine combustion sensor.

In another aspect, the predetermined threshold is substantially the same as a predefined pressure environmental operating limit of the hard disk drive.

Another aspect of the invention pertains to machine-readable instructions interoperable with a machine to perform the method described above.

In another aspect, the invention provides a motor vehicle. The motor vehicle comprises a peripheral device capable of determining information related to an ambient pressure and an audio system. The audio system includes a first audio source, a second audio source, and a central unit in communication with the first audio source, the second audio source, and the peripheral device. The central unit receives the ambient pressure and switches between the first audio source and the second audio source based on the ambient pressure.

In another aspect, the first audio source comprises a hard disk drive.

In another aspect, the central unit switches from the hard disk drive to the second audio source if the ambient pressure is less than a predetermined pressure.

In another aspect, the predetermined pressure is substantially the same as a predetermined environmental operating limit for pressure of the hard disk drive.

In another aspect, the central unit receives the ambient pressure and switches between the first audio source and the second audio source based on the ambient pressure whenever an audio selection from the first audio source is selected for play.

In another aspect, the peripheral device is selected from the group consisting of a barometric pressure sensor and an engine combustion sensor.

In another aspect, the peripheral device comprises a global positioning system receiver.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
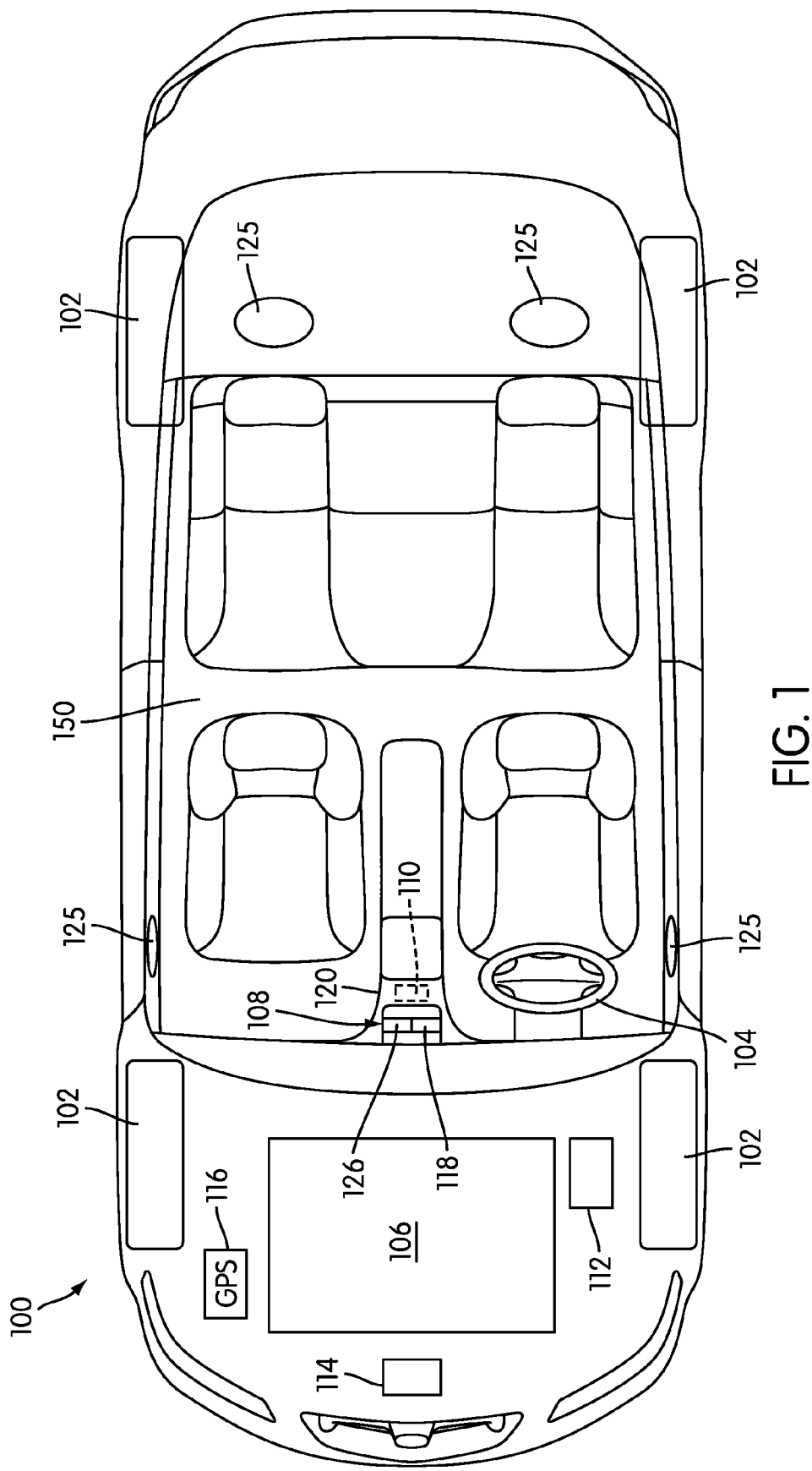
FIG. 1 is a schematic top view of a preferred embodiment of a motor vehicle with an audio system.

FIG. 1 is a schematic top plan view of a motor vehicle, generally indicated at 100, according to one preferred embodiment of the invention. Motor vehicle 100 has at least one wheel, a steering system, an engine, and a passenger compartment that is capable of supporting at least one human occupant. In the embodiment shown in FIG. 1, motor vehicle 100 includes four wheels 102, a steering system that includes steering wheel 104 and other associated structures (not shown in FIG. 1), and an engine 106. Motor vehicle 100 also includes a passenger compartment 150, which can accommodate a driver and a number of passengers. In some embodiments, for example, where the motor vehicle is a motorcycle, passenger compartment 150 is external, and the occupants ride on top of the motor vehicle.

In the embodiment shown in FIG. 1, motor vehicle 100 includes an audio system 108. Included in audio system 108 is a hard disk drive 110 containing digital audio information. As those of skill in the art will realize, only certain components of motor vehicle 100 are included for sake of clarity. In addition to those systems and methods described here, motor vehicle 100 may include any other system or component, and may implement a variety of other methods.

Engine 106 can be any device that provides or converts energy. In some embodiments, engine 106 may be a gasoline engine, a diesel engine, a hybrid gasoline/battery engine, or any other type of engine suitable for a motor vehicle. Preferably, engine 106 includes provisions that can provide power to audio system 100. In some cases, these provisions can include a battery 112 or an alternator. Either of these items or some other device can act as power source 106 for audio system 108.

Motor vehicle 100 also includes at least one ambient pressure sensor, generally indicated at 114 in FIG. 1. It will be understood that motor vehicle 100 includes several sensors and systems capable of providing ambient pressure data, and that any of these systems may constitute an "ambient pressure sensor" as that term is used here. For example, a combustion sensor used to regulate engine 106 may be used as ambient pressure sensor 114 under some circumstances. An independent barometric pressure sensor not associated with engine 106 may also be used as ambient pressure sensor 114.

Motor vehicles may also include global positioning system (GPS) receivers that are capable of determining position, including altitude, which can then be used to determine ambient pressure. In some embodiments, motor vehicle 100 includes a GPS receiver 116 that is capable of determining motor vehicle altitude, and thus, can be considered to be one type of ambient pressure sensor 114. If GPS receiver 116 is used as ambient pressure sensor 114, GPS receiver 116 may calculate ambient pressure itself using a relationship between altitude and pressure, or GPS receiver 116 may forward position data to audio system 108 for calculation. For clarity, GPS receiver 116 is indicated separately in this description.

In some embodiments, motor vehicle 100 will include engine and/or barometric pressure sensors and GPS receiver 116, either or all of which may be used as ambient pressure sensor 114. One or more of these components may be placed in motor vehicle 100 in any number of positions and connected in any number of ways. The precise manner in which ambient pressure sensor 114 is implemented and the way ambient pressure sensor 114 is connected with the electrical system of motor vehicle 100 is not critical so long as audio system 108 can communicate with ambient pressure sensor 114. Any device that provides pressure information to audio system 108 may be referred to as a "peripheral device" for purposes of this disclosure.

In some embodiments, a pressure absolute (PA) sensor is used. The PA sensor can be an IC located inside an electronic control unit (ECU) housing. In some cases, the ECU housing is waterproof. The air pressure inside the ECU housing is vented through a waterproof membrane. The PA sensor can be structurally similar to an amplified strain gauge diaphragm type sensor.

Controls 118 for audio system 108 are preferably positioned in a user accessible location within motor vehicle 100. In the embodiment shown in FIG. 1, motor vehicle 100 includes controls 118 for audio system 108 on a console 120 that is easily reachable by the driver and/or front seat passenger.

Audio system 108 preferably includes a display 126. In some embodiments, display 126 includes a monochrome or color LCD that is used to provide the user with information on the status of audio system 108. Interfaces for audio storage media, for example, a CD player slot and/or a cassette tape deck, may be located on console 120 along with controls 118. In some embodiments, a hard disk drive docking device may be included for the insertion of a hard disk drive supplied by a user, although in the preferred embodiment, a hard disk drive 110 is secured within motor vehicle 100 within console 120.

Controls 118 and other features of audio system 108 may vary widely from embodiment to embodiment. For example, in some embodiments, some of controls 118 may be on steering wheel 104, and secondary controls may be provided in the rear of the cabin for the use of rear-seat passengers. Additionally, audio storage media interfaces may be located in other parts of the motor vehicle, for example, a CD-changer or hard disk drive mounted in the trunk or other cargo space of the motor vehicle.

Figure 2:
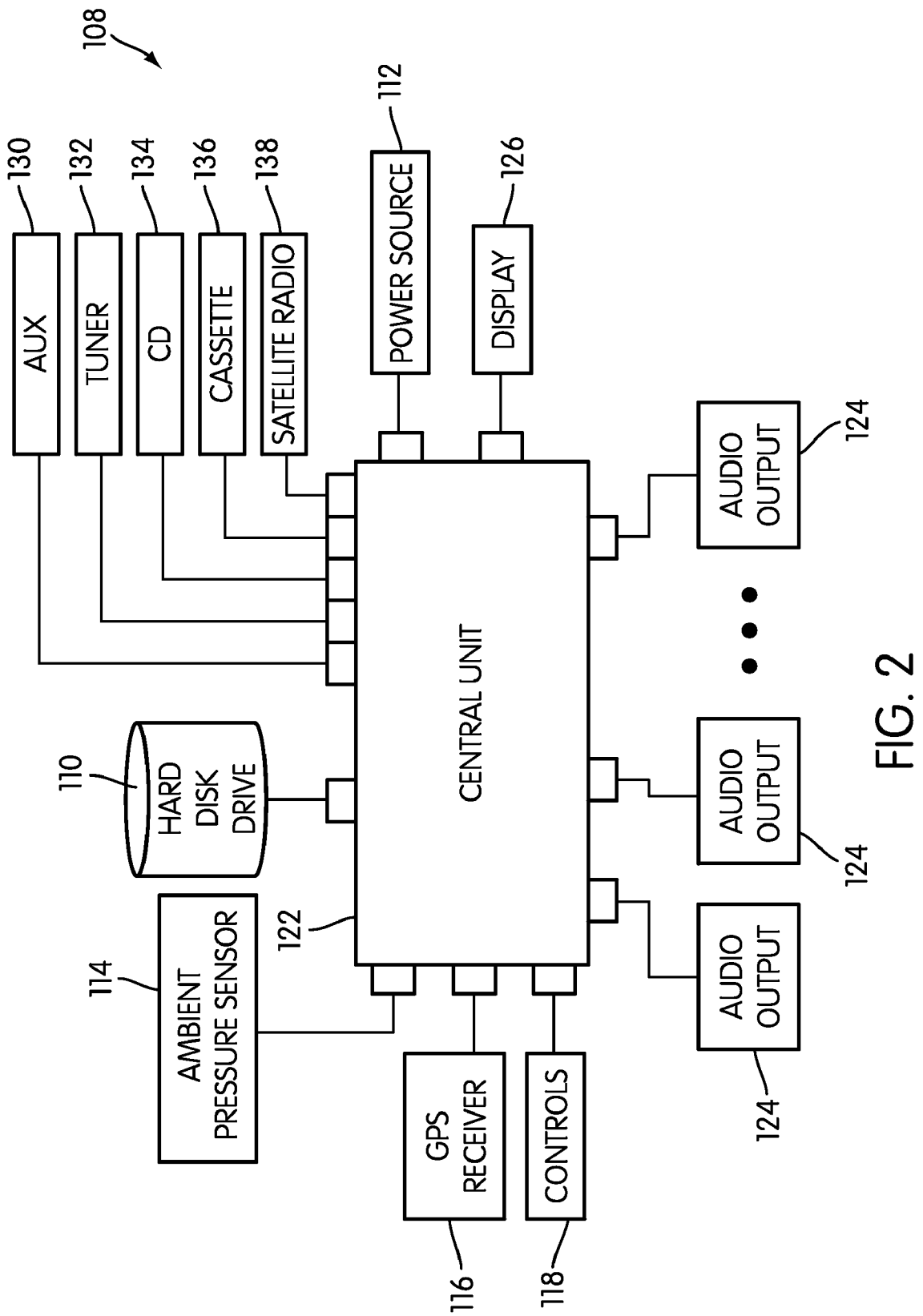
FIG. 2 is a schematic diagram of a preferred embodiment of an audio system.

FIG. 2 is a schematic diagram of a preferred embodiment of audio system 108 and some additional associated components. Audio system 108 comprises a central unit 122. In the embodiment shown in FIG. 2, central unit 122 receives audio information and instructions, processes the audio information and instructions, and then provides an audio output. To assist with these tasks, some embodiments of central unit 122 may include one or more of the following components or features: digital signal processors (DSPs), input/output circuits, digital-to-analog (D/A) converters, analog-to-digital (A/D) converters, and/or other such components. Central unit 122 may be implemented as a single integrated circuit, as a group of interoperating circuits, as one or more modules and/or one or more components.

In the embodiment shown in FIG. 2, various components can communicate or interact with central unit 122. In the embodiment shown in FIG. 2, hard disk drive 110, ambient pressure sensor 114, and controls 118 are all connected to central unit 122. In addition to those components, central unit 122 communicates with display 126, to display relevant messages to the user.

Power source 112 represents any power supply that provides power to central unit 122. In some embodiments, power source 112 is a battery associated with motor vehicle 100; in other embodiments, power source 112 is an alternator, generator, or other kind of power source.

Also connected to central unit 122 is at least one audio output 124. In some embodiments, a plurality of audio outputs 124 is provided, and each audio output 124 is connected to a corresponding speaker 125. In other embodiments, audio output 124 acts as a pre-amp or line level output and is in communication with an external amplifier, crossover, or distribution network. If a crossover or distribution network is used, those devices can route the signal provided audio output 124 to a suitable number of external amplifiers, which eventually provide an amplified signal to one or more speakers 125.

Speakers 125, as shown in FIG. 1, are preferably arrayed about interior 130 of motor vehicle 100. Preferably, speakers 125 are located in the front and rear of the interior motor vehicle 100. Any number of speakers 125 may be connected to central unit 122, and each speaker 125 may have different frequency response characteristics. For example, any combination of tweeters, midrange speakers, and subwoofers, to name a few examples, may be connected through audio outputs 124 to central unit 122. Central unit 122 may be adapted to output particular power levels and/or frequency ranges to individual speakers 125, depending on the response characteristics of each. The communication between audio outputs 124 and speakers 125 may be analog, digital, or optical communication.

In addition to speakers 125, central unit 122 may communicate with other audio sources, which can include a tuner 132, a CD player 134, a cassette deck 136, a satellite radio 138, or an auxiliary port 130. Audio sources in addition to those listed above can also be placed in communication with central unit 122. Central unit 122 can communicate with one, several or all of the other audio sources.

The connections between central unit 122 and the other components and/or audio sources illustrated in FIGS. 1 and 2 may use any communication scheme. Preferably, power source 112 provides power to central unit 122 and the various other items are in communication with central unit 122 using some form of communication. For example, the various items can communicate with one another using wire line or wireless communications protocols. The various items can also communicate with one another using a network, either a wire line based network or a wireless network. Additionally, analog communication schemes, optical communication schemes, and digital communications schemes can also be used. In some cases, digital communications scheme include the use of a digital communication bus in motor vehicle 100. In some embodiments, this communication bus can use the ICANN digital vehicle bus standard. In an exemplary embodiment, the Controller Area Network (CAN) system is based on the BOSCH CAN 2.0 Extended Format Protocol. Other types of network protocols could be used as well. In some embodiments, one or more of the various items are integrally formed with central unit 102.

During operation of audio system 108, controls 118 allow the user to select an audio source 110, 128 and the particular audio portion, song, radio station to which the user wishes to listen. Controls 118 may also allow the user to specify common sound reproduction parameters, such as the levels of bass, treble, fade, and the sound balance. Central unit 122 may be programmed with whatever methods or programs are necessary to perform these functions.

As was described above, each hard disk drive has environmental operating limits, beyond which the hard disk drive is not designed to operate. In a preferred embodiment, central unit 122 executes a method to ensure that the current ambient pressure is within the environmental operating limits of hard disk drive 110. Environmental operating limits can be provided by the manufacturer of hard disk drive 110. Preferably, central unit 122 is programmed with a predetermined pressure threshold for hard disk drive 110 that corresponds to the environmental operating limit for pressure that is set by the manufacturer of hard disk drive 110. In some cases, the manufacturer of motor vehicle 100 may alter the predetermined pressure threshold up or down if desired.

Figure 3:
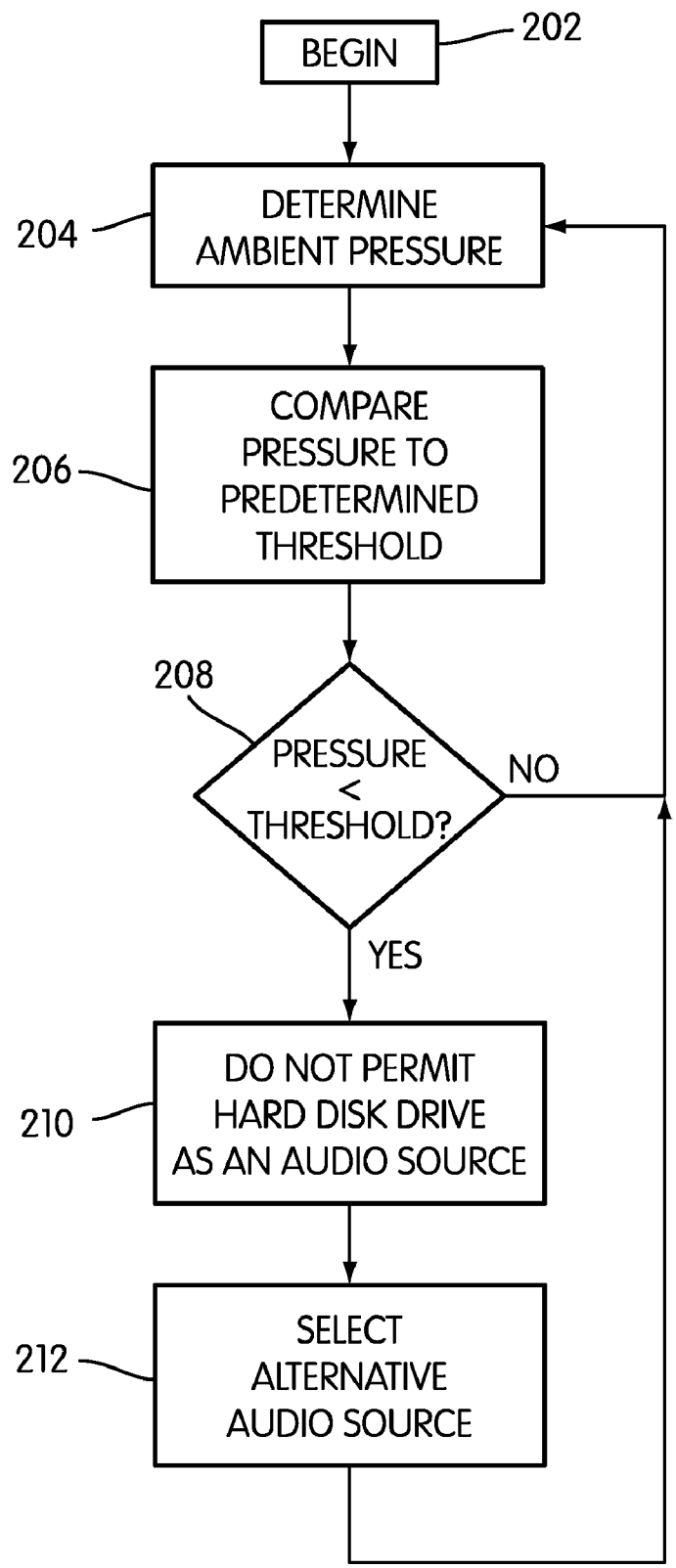
FIG. 3 is a flow diagram of a preferred embodiment of a method of selecting an audio source.

FIG. 3 is a flow diagram of a method 200 of selecting an audio source that ensures that hard disk drive 110 is disabled as an audio source if the ambient pressure is less than the predetermined threshold. Method 200 begins at 202 and continues with step 204. At step 204, central unit 122 receives ambient pressure information by interrogating ambient pressure sensor 114 and/or GPS receiver 116. After the ambient pressure information has been received from ambient pressure sensor 114 or GPS receiver 116, central unit 122 can compute or determine the ambient pressure if the sensor does not provide a direct reading of ambient pressure. For example, GPS receiver 116 may provide vertical position information, and from this vertical position information, central unit 122 may compute the ambient pressure. In some embodiments, Central unit 122 may interrogate more than one ambient pressure sensor 114 if more than one is available, and may average the result or choose preferentially among the results, depending on the accuracy of the various sensors available.

After the ambient pressure has been determined, the method moves on to step 206, where the ambient pressure is compared to the predetermined threshold. In step 208, if the ambient pressure is less than the predetermined threshold, then method 200 passes to step 210, where hard disk drive 110 is not permitted as an available audio source. In some embodiments, method 200 includes an optional step 212 of selecting an alternative audio source. Preferably, the alternative audio source is an audio source that is capable of providing audio information under the current low pressure conditions experienced by audio system 108. The alternative audio source can be a tuner 132, a CD player 134, a cassette deck 136, a satellite radio 138 or any other kind of audio source. In embodiments that do not include step 212, the audio source selected just prior to the selection of hard disk drive 110 can be selected or no audio source can be selected while audio system 108 waits for instructions from the user.

Returning to step 208, if the ambient pressure is greater than or equal to the predetermined threshold, no action is taken and method 200 returns to the beginning step 202. This assumes that the default condition is that hard disk drive 110 is an available audio source, which the preferred default setting.

Thus, assuming that the predetermined threshold is substantially the same as the operating pressure limit for hard disk drive 110, method 200 prevents the selection of hard disk drive 110 when the ambient pressure is beyond the operating pressure limit for hard disk drive 110.

Method 200 may begin at step 202 under a number of different circumstances. In some cases, method 200 is executed each time the user attempts to select hard disk drive 110 as an audio source, and in other cases, method 200 may be run at regular intervals even when hard disk drive 110 is not selected as a digital audio source. In some embodiments, method 200 may be run at any other time deemed necessary to prevent damages to hard disk drive 110 and/or protect data on hard disk drive 110. In some cases, method 200 is run when the ambient pressure reaches a certain value. The disablement of hard disk drive 110 in step 210 of method 200 may also be associated with any other instructions deemed necessary or desirable, such as an instruction to park the hard disk drive heads and/or enter a "sleep" or powered-down mode. Although not shown in FIG. 3, method 200 may also include the optional step of notifying the user that hard disk drive 110 is unavailable, for example, using display 126.

The comparison shown in step 208 of method 200 assumes that if the ambient pressure is less than the predetermined pressure threshold, hard disk drive 110 should be disabled as an audio source. Lower pressures generally occur at higher altitudes, so hard disk drive 110 might be disabled as an audio source, for example, when motor vehicle 100 ascends a high mountain. Although most hard disk drives are designed to operate at sea level and there are relatively few places with an ambient pressure higher than that of sea level, method 200 could also be adapted with an additional decision task in which the ambient pressure is compared to a second, predetermined high pressure threshold, and hard disk drive 110 is disabled if the ambient pressure exceeds the predetermined high pressure threshold.

Once hard disk drive 110 is disabled, central unit 122 may be programmed to switch to a particular additional audio source 128 by default, or it may switch to the last used additional audio source 128.

Method 200 and other methods according to other embodiments of the invention may be encoded in any machine-readable language compatible with central unit 122 to implement the illustrated tasks. The particular language used may be a high level language (e.g., C, C++, Java, J++, Visual Basic, etc.) or it may be a low-level language (e.g., assembly code), depending on the capabilities of central unit 122. More generally, methods according to embodiments of the invention may be encoded in any machine-readable form, to be stored on any machine-readable medium, so as to interoperate with a machine, such as central unit 122, to perform the methods.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A motor vehicle, comprising:
a peripheral device comprising an apparatus for determining information directly corresponding to an ambient atmospheric pressure value; and
an audio system, including a first audio source comprising a hard disk drive containing digital audio information, a second audio source, and a central unit in communication with the first audio source, the second audio source and the peripheral device;
wherein the central unit receives the information directly corresponding to the ambient atmospheric pressure value from the peripheral device;
wherein the central unit receives the information directly corresponding to the ambient atmospheric pressure value and prevents the selection of the hard disk drive as an available digital audio source if the ambient atmospheric pressure value is less than a predetermined pressure,
wherein the first audio source is currently selected; and
wherein the central unit is configured to automatically switch from the first audio source to the second audio source based on the information directly corresponding to the ambient atmospheric pressure, and automatically starts playing the second audio source.

2. The motor vehicle according to claim 1, wherein the peripheral device comprises a barometric pressure sensor.

3. The motor vehicle according to claim 1, wherein the peripheral device comprises a sensor used to control an engine installed in a motor vehicle.

4. The motor vehicle according to claim 1, wherein the peripheral device comprises a global positioning system receiver associated with the motor vehicle.

5. The motor vehicle according to claim 1, wherein the predetermined pressure is substantially the same as an environmental operating limit of the hard disk drive.

6. The motor vehicle according to claim 1, wherein the audio system further comprises a third audio source, and the central unit switches to a pre-selected alternative audio source chosen from the second audio source and the third audio source when the first audio source is selected and the ambient atmospheric pressure is less than the predetermined pressure.

7. The motor vehicle according to claim 1, wherein the second audio source is selected from the group consisting of CD players, DVD players, AM/FM radio receivers, and satellite radio receivers.

8. The motor vehicle according to claim 1, wherein the central unit is configured to automatically switch from the second audio source to the first audio source if the ambient atmospheric pressure value increases to a value greater than the predetermined pressure, and automatically starts playing the first audio source.

9. A method of selecting an audio source in a motor vehicle audio system including a hard disk drive as an audio source, comprising the steps of:
determining an ambient pressure using information received from a peripheral device;
comparing the ambient pressure to a predetermined threshold;
automatically switching from the hard disk drive to a second audio source when the ambient pressure decreases to a value less than the predetermined threshold, and automatically switching from the second audio source to the hard disk drive when the ambient pressure increases to a value greater than or equal to the predetermined threshold.

10. The method according to claim 9, wherein the peripheral device comprises a global positioning system receiver, and the determining comprises:
 obtaining altitude data based on a location of the motor vehicle established by the global positioning system receiver; and
 calculating a corresponding ambient pressure using a relationship between altitude and pressure.

11. The method according to claim 9, wherein the peripheral device comprises a barometric pressure sensor.

12. The method according to claim 9, wherein the peripheral device comprises an engine combustion sensor.

13. The method according to claim 9, wherein the predetermined threshold is substantially the same as a predefined pressure environmental operating limit of the hard disk drive.

14. A motor vehicle, comprising:
 a peripheral device comprising an apparatus for determining information directly corresponding to an ambient atmospheric pressure;
 an audio system, including:
  a first audio source,
  a second audio source, and
  a central unit in communication with the first audio source, the second audio source and the peripheral device;
 wherein the central unit receives the information directly corresponding to ambient atmospheric pressure and automatically switches between the first audio source and the second audio source based on the information directly corresponding to ambient atmospheric pressure.

15. The motor vehicle according to claim 14, wherein the first audio source comprises a hard disk drive.

16. The motor vehicle according to claim 15, wherein the audio system further comprises a third audio source, and the central unit switches from the hard disk drive to the latter slaved audio source chosen from the second audio source and the third audio source if the ambient pressure is less than a predetermined pressure.

17. The motor vehicle according to claim 16, wherein the predetermined pressure is substantially the same as a predetermined environmental operating limit for pressure of the hard disk drive.

18. The motor vehicle according to claim 14, wherein the central unit receives information directly corresponding to the ambient atmospheric pressure and automatically switches from the first audio source to the second audio source when the ambient atmospheric pressure decreases to a value below a predetermined value if an audio selection from the first audio source is selected for play, and
 the central unit automatically switches from the second audio source to the first audio source when the ambient atmospheric pressure increases to a value greater than or equal to the predetermined value if an audio selection from the first audio source is selected for play.

19. The motor vehicle according to claim 14, wherein the peripheral device is selected from the group consisting of a barometric pressure sensor and an engine combustion sensor.

20. The motor vehicle according to claim 14, wherein the peripheral device comprises a global positioning system receiver associated with the motor vehicle.

* * * * *